June 28, 1932.  J. I. HULL  1,865,414

LOAD CONTROL

Filed Aug. 28, 1930  2 Sheets-Sheet 1

Inventor:
John I. Hull,
by Charles E. Tullar
His Attorney.

June 28, 1932.  J. I. HULL  1,865,414
LOAD CONTROL
Filed Aug. 28, 1930   2 Sheets-Sheet 2

Inventor:
John I. Hull,
by Charles E. Tuller
His Attorney.

Patented June 28, 1932

1,865,414

UNITED STATES PATENT OFFICE

JOHN I. HULL, OF SCHENECTADY, NEW YORK, ASSIGNOR TO GENERAL ELECTRIC COMPANY, A CORPORATION OF NEW YORK

LOAD CONTROL

Application filed August 28, 1930. Serial No. 478,468.

My present invention relates to a regulating set for automatically controlling the current flowing in an induction motor and my invention is particularly useful for controlling the energy flow between two alternating current sources connected to each other through a frequency converter set. My invention however also applies to the control of the current flowing in any electrical circuit irrespective of whether direct or alternating current flows in the circuit. I prefer however to describe my invention in connection with a frequency converter set because this description will also make it obvious to those skilled in the art how my invention can be applied to the control of the current flowing in any electrical circuit.

In U. S. patent application Serial No. 343,757, Seiz, filed Mar. 1, 1929, assigned to the assignee of this invention, there is illustrated and described a regulating set for a frequency converter set that will automatically vary the excitation on the regulating machine to maintain a substantially constant and direct ratio between an independent regulating current and the energy flow between the two alternating current sources irrespective of variations in the frequencies of the sources. The change in the excitation of the regulating machine is almost simultaneous with a change in the frequency since there is no inertia of moving parts to overcome in varying the excitation and the set is highly sensitive with only minute instantaneous fluctuations in the energy flow even with rapid and comparatively large variations in the frequencies. A study of the description and drawings in the patent application referred to will show that the frequency changer must be of sufficient size to supply the independent regulating current and the exciter must be of sufficient size to carry the three exciting windings described. The object of the present invention is to provide a regulating set which retains the advantage of high sensitivity and which is arranged so that the sizes of the exciter and frequency changer are considerably reduced for an equally rated regulating set, thus obtaining the additional advantage of a considerable reduction in the cost of the regulating set.

My invention produces a regulating set having a high sensitivity and a greatly reduced cost by providing as shown in one embodiment, (Fig. 1), a regulating machine concatenated with the wound secondary, the regulating machine having an exciting winding energized by an exciter having a self-excited winding for normally producing the resulting flux of the exciter to vary the excitation of the regulating machine so as to maintain the desired energy flow irrespective of variations in the frequencies of the sources. The exciter also has an additional exciting winding energized by a small corrective current when the energy flow changes from its adjusted value, this corrective current operating to bring the energy flow back to its adjusted value whereupon the corrective current reduces to zero. The corrective current is obtained from a frequency changer which is energized by the secondary winding of a transformer having two primary windings producing opposing magnetomotive forces, one of the primary windings being energized by an independent regulating current and the other winding being energized by the current flowing in the primary winding of the asynchronous machine, the two primary windings producing zero flux when the energy flow has the desired value. The excitation of the regulating machine is varied without using moving mechanical parts and therefore the regulating set has a high sensitivity and only a very small corrective current will flow to return the energy flow to its adjusted value. The frequency changer is of the minimum size because it supplies only the small corrective current and the exciter is of substantially standard size because the additional exciting winding is comparatively small. The saving in cost on the frequency changer and exciter is considerably more than the cost of the transformer, thus decreasing the cost of the regulating set. A study of the description and drawings of the patent application referred to will also show that the minimum number of commutator machines in the regulating set is two, this being obtained by combining the exciter and regulating machines into one machine to be concatenated with the wound secondary. My invention however, as shown in one of the embodiments thereof (Fig. 3), makes possible a regulating set consisting of only one commutator machine of substantially standard size and a small transformer, thus effecting an additional and considerable reduction in the cost of the regulating set.

The operation of my invention and the advantages gained thereby will be best understood from the following description when considered in connection with the accompanying drawings while the features of my invention which are considered to be novel and patentable are pointed out in the appended claims.

Fig. 1 represents one embodiment of my invention as applied to a frequency converter set connected between two sources of alternating current. In this figure I represent a regulating set consisting of a transformer supplying a corrective current through a frequency changer machine to one of the exciting windings of an exciter machine which supplies the exciting current to a regulating machine. The exciter and the regulating machine control the current flowing in the wound secondary of the asynchronous machine acting as one element of the frequency converter set.

To simplify the drawings I have represented them with single connecting leads but it is obvious that my invention is applicable to any number of connecting leads for any number of phases.

Figure 1:
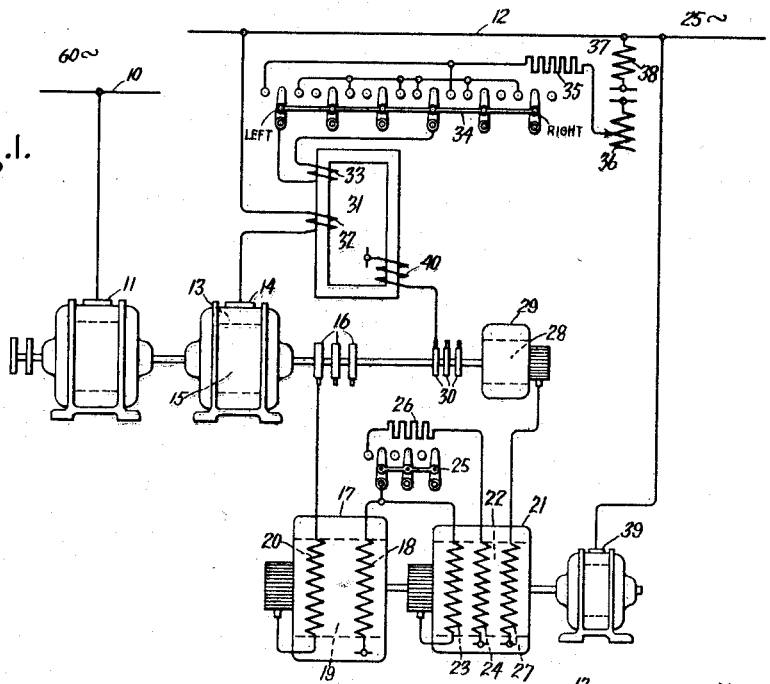

In Fig. 1, 10 represents a 60 cycle alternating current source connected to a synchronous machine 11 and 12 represents a 25 cycle alternating current source connected to the primary winding 13 of the asynchronous machine 14 having a wound secondary 15 connected to collector rings 16. The regulating machine 17 has a stationary exciting winding 18 and a rotating commutated armature winding 19 connected in series with the compensating winding 20 to the collector rings 16. The exciter 21 has a rotating commutated armature winding 22 connected in series with the compensating winding 23 to the exciting winding 18. The exciter 21 also has a stationary exciting winding 24 energized by the armature winding 22 through the switch 25 and the stabilizing resistance 26. The exciter 21 also has an additional stationary exciting winding 27 connected to the rotating commutated winding 28 of the frequency changer 29 whose collector rings 30 are connected to the commutated winding 28 or to a separate rotating winding in the frequency changer 29. The transformer 31 has a primary winding 32 in series with the primary winding 13 of the asynchronous machine 14 and the transformer 31 has another primary winding 33 energized by the source 12 through the switch 34, the stabilizing resistance 35 and the adjustable tap secondary winding 36 of the transformer 37 whose primary winding 38 is connected to the source 12. The induction motor 39 is connected to the source 12 and drives the machines 17 and 21. The secondary winding 40 of the transformer 31 is connected to the rings 30. The machines 11, 14 and 29 are direct connected so as to rotate at the same speeds and 14 and 29 have the same number of poles. The connections from 40 to the rings 30 are such that the flux in 29 rotates opposite to its mechanical rotation and the currents supplied to the exciting winding 27 will have the same frequency as the currents in the wound secondary 15. To simplify the explanation of my invention I assume that the motor 39 rotates at constant speed, the transformer 31 and the machines 17, 21 and 29 operate without magnetic saturation, the resistance 35 is many times the reactance of the windings 33, 40 and 27 so that the current in 33 and hence in 27 is substantially directly proportional to the voltage supplied by 36, and the stabilizing resistance 26 is many times the reactance of the exciting winding 24 so that the current in 24 is substantially directly proportional to the voltage of the armature winding 22. I also assume that 13 and 15 have the same number of turns and therefore their active load currents have the same value, and I will neglect the magnetizing currents of the machine 14 and the transformer 31 flowing in 32 and 33 respectively. The primary windings 32 and 33 are arranged to produce opposing magnetomotive forces, and to give a concrete example I assume that they have equal and opposing magnetomotive forces when their respective currents have the ratio of 100 to 1. I also assume that 11 has 24 poles and 14 has 10 poles and therefore both 11 and 14 have synchronous speeds of 300 r. p. m.

I will first describe the operation with the switch 25 open, thus not using the winding 24. Assume the switch 34 open as shown and the frequencies of 10 and 12 are 60 and 25 cycles respectively. At these frequencies 11 and 14 have the same synchronous speed, there is no energy flow between the sources and no current flows in 32 as I am neglecting the magnetizing current in 13. There is therefore no flux in 31 and no voltages are generated by 21 and 17. The primary winding 13 will have a magnetizing flux revolving at 300 r. p. m. and 11 will rotate 15 at 300 r. p. m., and thus no voltage is induced in 15. As neither 15 or 17 produce any voltage there will be no current flowing in 15 which corresponds to no energy current flowing in 13. Assume that it is desired to have an energy flow from 12 to 10. The switch 34 is closed to the left and assume for example that 36 is adjusted so that one ampere flows in 33. The immediate effect is to produce a flux in 31, thus inducing a voltage in 40 which causes a current to flow in 27 and 21 generates a voltage which energizes 18, thus causing 17 to generate a voltage which circulates a current in 15. I assume that with 34 closed to the left the time phase relationship between the flux in 31 and the voltage of 12 is such that the direction of the current in 15 corresponds to 14 acting as a motor and therefore there is a flow of energy from 12 to 10. The current in 15 can not however be as high as 100 amperes because this corresponds to 100 amperes in 32 and then 31 would have no flux, 17 would have no voltage, and therefore could not maintain the current flow in 15. The current in 15 and hence in 32 therefore attains that value below 100 amperes where the difference between the magnetomotive forces of 32 and 33 cause a flux in 31 which results in that voltage of 17 which can maintain that value below 100 amperes flowing in 15. The actual value of the current in 15 and hence in 32 depends on the number of turns in the windings 32 and 33 as this affects the value of flux in 31 for a given difference between 100 amperes and the actual current flowing in 32, and the actual value of the current in 15 also depends on the voltage generated by 17, 21 and 29 for a given value of flux in 31. I will assume that the windings in 17, 21, 29 and 31 are so proportioned that when one ampere flows in 33 and 98 amperes flow in 32 there will be the necessary flux in 31 so that 17 generates a voltage able to circulate 98 amperes in 15 and hence 98 amperes flow in 13 and 32. If 36 is now adjusted so that 2 amperes flow in 33, the flux in 31 increases, the voltage of 17 increases and the current in 15 and hence in 32 increase to that value where the flux of 31 results in that voltage of 17 that can maintain that current in 15 and I assume that this corresponds to 196 amperes in 15, 13 and 32 and thus the energy flow from 12 to 10 is increased. The energy flow from 12 to 10 may be decreased by decreasing the current flowing in 33.

Assume the condition when 2 amperes flow in 33 and 196 amperes flow in 15, 13 and 32. If the frequency of 12 decreases below 25 cycles or the frequency of 10 increases above 60 cycles the secondary 15 will rotate faster than the flux of 13 and a voltage will be induced in 15 that will oppose the voltage of 17. The immediate effect is a decrease in the current flowing in 15 and hence in 13 and 32, thus increasing the flux of 31 and increasing the voltage of 17. The voltage of 17 can not however increase to that value where it will overcome the voltage of 15 and circulate 196 amperes in 15 because this would cause 31 to have its prior lower flux and 17 its prior lower voltage which can no longer maintain 196 amperes in 15 because of the opposing voltage of 15. The current in 15 and hence in 13 and 32 therefore decrease to that value below 196 amperes where the flux of 31 results in that voltage of 17 that can overcome the voltage of 15 and maintain that value below 196 amperes flowing in 15. If on the other hand the frequency of 12 increases above 25 cycles, or the frequency of 10 decreases below 60 cycles, the secondary 15 will rotate slower than the flux of 13 and a voltage will be induced in 15 that aids the voltage of 17. The immediate effect is an increase in the current flowing in 15 and hence in 13 and 32, thus decreasing the flux of 31 and decreasing the voltage of 17. The voltage of 17 can not however decrease to that value where aided by the voltage of 15 it will circulate 196 amperes in 15 because this would cause 31 to have its prior higher flux and 17 its prior higher voltage which is no longer necessary to maintain 196 amperes in 15 because of the assisting voltage of 15. The current in 15 and hence in 13 and 32 therefore increases to that value above 196 amperes where the flux of 31 results in that voltage of 17 which aided by the voltage of 15 will maintain that value above 196 amperes flowing in 15. The amount of variation in energy flow with a given change in frequency will depend on the proportioning of the windings in the regulating set. The energy flow may be maintained constant by suitably adjusting the current in 33 when the frequencies change. If it is desired to have an energy flow from 10 to 12 this can be obtained by closing the switch 34 to the right, thus reversing the time phase relationship between the flux in 31 and the voltage of 12 and therefore reversing the relative voltage of 17 so that the direction of the current in 15 corresponds to 14 acting as a generator. The operation will be the same as the operation with energy flow from 12 to 10.

Comparatively small variations in energy flow with changes in frequency may be obtained by suitably proportioning the windings in the regulating set, but the physical size and hence the cost of the regulating set increases as the variations in energy flow are decreased for a given change in frequency, and therefore my regulating set as hereinbefore described will be preferably used in installations where it is permissible to have moderate variations in the energy flow with changes in frequency. It is obvious that if the above described type of regulating set is used and the energy flow is to be maintained substantially constant or at least limited to comparatively small variations with changes in the frequencies, it will result in a regulating set of large physical size and correspondingly increased cost. I overcome this disadvantage by producing in 21 and hence in 17 an additional magnetomotive force which is substantially directly proportional to the voltage of 21. The additional magnetomotive force is produced by the winding 24 and a brief explanation of the operation with the winding 24 follows: Assume the switch 25 closed, the switch 34 open, and the frequencies of 10 and 12 at 60 and 25 cycles, respectively. There is no flux in 31, no current flows in 27 and no voltage is generated by 17 and 21. No current can therefore flow in 24 and thus 17 and 21 are incapable of generating voltage and no current flows in the winding 15 since there is no induced voltage in 15 when the frequencies of 10 and 12 are at 60 and 25 cycles respectively. Assume that it is desired to have an energy flow from 12 to 10. The switch 34 is closed to the left and 36 is adjusted so that one ampere flows in 33. The immediate effect is to produce a flux in 31, thus inducing a voltage in 40 which causes a corrective current to flow in 27 and voltages are generated by 21 and 17 which cause currents to flow in 24 and 15. The winding 24 is suitably designed so that the current flow therein produces a magnetomotive force in 21 that is sufficient to give the necessary fluxes in 21 and 17 so that the voltage of 17 will be sufficient to maintain a flow of 100 amperes in 15, and therefore no additional flux and hence no magnetomotive force is needed from winding 27, thus permitting 31 to have zero magnetic flux which corresponds to 100 amperes flowing in 32, no current flowing in 40 and hence no corrective current in 27. The winding 24 can not by the self-excitation process increase the voltages of 21 and 17 higher than necessary to maintain 100 amperes in 15 because this would correspond to more than 100 amperes flowing in 13 and 32, thus producing a flux in 31 which is relatively opposite in direction to the flux in 31 when the switch 34 was first closed. This would cause a relatively reversed corrective current to flow in 27 which would produce a magnetomotive force opposing the magnetomotive force of winding 24, thus reducing the voltages of 21 and 17 and reducing the current in 15 to 100 amperes, and the result is that the currents flowing in 15, 13 and 32 remain at 100 amperes. It should now be obvious why winding 24 can not cause 21 to build up a voltage when switch 34 is open. If the energy flow is to be increased as by increasing the current in 33 to 2 amperes, the immediate effect is a flux in 31 in the same relative direction that the flux in 31 had when the switch 34 was first closed and this causes a corrective current to flow in 27 to give a magnetomotive force in 21 that assists the magnetomotive force of 24, thus increasing the voltages of 21 and 17. There is however the simultaneous effect of an increasing flow of current in 24 which reaches that value where it produces a magnetomotive force in 21 that is sufficient to give the necessary fluxes in 21 and 17 so that the voltage of 17 will be sufficient to maintain a flow of 200 amperes in 15, and therefore no additional flux and hence no magnetomotive force is needed from winding 27, thus permitting 31 to have zero magnetic flux which corresponds to 200 amperes flowing in 32, no current flowing in 40 and hence no corrective current in 27. If the energy flow is to be decreased as by decreasing the current in 33 to one ampere, the immediate effect is a flux in 31 which is relatively opposite in direction to the flux in 31 when the switch 34 was first closed. This causes a relatively reversed corrective current to flow in 27 which produces a magnetomotive force in 21 opposing the magnetomotive force of 24, thus decreasing the voltages of 21 and 17. There is however the simultaneous effect of a decreasing flow of current in 24 which reaches that value where it produces a magnetomotive force in 21 that is sufficient to give the necessary fluxes in 21 and 17 so that the voltage of 17 will be sufficient to maintain a current of 100 amperes in 15, and therefore no opposing magnetomotive force is needed from 27, thus permitting 31 to have zero magnetic flux which corresponds to 100 amperes flowing in 32, no current flowing in 40 and hence no corrective current in 27.

If the frequency of 12 decreases or the frequency of 10 increases the secondary 15 will rotate faster than the flux of 13 and a voltage will be induced in 15 that will oppose the voltage of 17. The immediate effect is a decrease in the current flowing in 15 and hence in 13 and 32, thus producing a flux in 31 in the same relative direction that the flux in 31 had when the switch 34 was first closed and this causes a corrective current to flow in 27 to give it a magnetomotive force to assist the magnetomotive force of 24, thus increasing the voltages of 21 and 17. There is however the simultaneous effect of an increasing flow of current in 24 which reaches that value where it produces a magnetomotive force in 21 that is sufficient to give the necessary fluxes in 21 and 17 so that the voltage of 17 will be sufficient to overcome the voltage of 15 and maintain a flow of 100 amperes in 15. No additional flux and hence no magnetomotive force is now needed from 27, thus permitting 31 to have zero flux which corresponds to 100 amperes flowing in 32, no current flowing in 40 and hence no corrective current in 27. If the frequency of 12 is increased or the frequency of 10 is decreased the secondary 15 will rotate slower than the flux of 13 and a voltage will be induced in 15 that will aid the voltage of 17. The immediate effect is an increase in the current flowing in 15 and hence in 13 and 32, thus producing a flux in 31 which is relatively opposite in direction to the flux in 31 when 34 was first closed and this causes a corrective current to flow in 27 to give a magnetomotive force in 21 opposing the magnetomotive force of 24, thus decreasing the voltages of 21 and 17. There is however the simultaneous effect of a decreasing flow of current in 24 which reaches that value where it produces a magnetomotive force in 21 that is sufficient to give the necessary fluxes in 21 and 17 so that the voltage of 17 aided by the voltage of 15 will maintain a flow of 100 amperes in 15. No opposing flux and hence no magnetomotive force is now needed from 27, thus permitting 31 to have zero flux which corresponds to 100 amperes flowing in 32, no current flowing in 40 and hence no corrective current in 27. It is evident that the energy flow can be adjusted to the desired value and a substantially constant and direct ratio between the energy flow and the independent regulating current flowing in 33 will be maintained irrespective of variations in the frequencies of 10 and 12. It is obvious that a change in the impedance of 15, 19 or 20 will not disturb the automatic maintenance of a substantially constant and direct ratio between the energy flow and the independent regulating current in 33 because an increase in the impedance has the equivalent effect of 15 generating a voltage in opposition to the voltage of 17 and a decrease in the impedance has the equivalent effect of 15 generating a voltage aiding the voltage of 17. If the switch 34 is closed to the right the flow of energy will be from to to 12 and the operation of the regulating set will be as described with the energy flow from 12 to 10.

When the current in 33 is varied to change the energy flow or when the frequencies vary, the effects produced by the windings in the regulating set are practically simultaneous because there is no inertia of moving parts to overcome. The regulating set therefore has a very high sensitivity and only a very small corrective current will flow from 40 through 29 and 27 when the energy flow is being adjusted by changing the current in 33 and for similar reasons there will be only a very small corrective current automatically flowing from 40 through 29 and 27 to bring the energy flow back to its adjusted value when one or both of the frequencies vary. The frequency changer 29 can therefore be made very small and the exciter 21 can be made of practically standard physical size since the extra winding 27 can be made very small, and therefore 29 and 21 can be made considerably smaller than the corresponding machines of an equal k. v. a. rated regulating set of the type described and illustrated in United States patent application Serial No. 343,757. The saving in the cost of the frequency changer and exciter is considerably more than the cost of the transformer since the latter is a stationary piece of apparatus and can be made very small because it has only to supply the small corrective current, and therefore my regulating set not only has a very high sensitivity but also the additional advantage of being considerably cheaper to build. If the winding 24 is omitted the regulating set will have a very high sensitivity even if it does not automatically maintain a constant energy flow for a given current in 33 with changes in the frequencies, and it is obvious that the regulating set will be considerably cheaper to build than the set described in the patent application Serial No. 343,757.

If 14 drives the usual types of motor loads and winding 24 is used it is possible to adjust the motor primary current and automatically maintain the adjusted primary current irrespective of changes in the mechanical output of the motor within the speed range of the machines, and if winding 24 is not used the primary current can be adjusted but it will vary somewhat from its adjusted value with changes in the mechanical output of the motor. The motor primary current can therefore be limited so as to prevent the motor from being injured by overloads. The torque of 14 depends on its current and flux and it is therefore possible to adjust the motor torque and to have a constant torque for a given current in 33. The speed of 14 will automatically vary till the load driven by the motor 14 requires the torque exerted by the motor. This control of the motor torque may be desirable for driving loads at variable speeds so as to require a constant driving torque from the motor 14. An example of such a load is a boiler fan whose speed it is desired to increase when the boiler fire becomes clogged so that the increased fan pressure will force the required amount of air through the fire.

From the explanations given in connection with the control of energy flow it should be obvious that if 15 is any type of alternating current circuit and if it is connected in series with 32 it will be possible by employing winding 24 to adjust the current flow in 15 and automatically maintain the adjusted current irrespective of changes in the impedance of 15, and if winding 24 is not used the current flow in 15 can be adjusted but it will vary somewhat from its adjusted value with changes in the impedance of 15.

I have described my invention with 31 as a transformer but obviously any electrically equivalent voltage producing means may be used in place of 31. I have described my invention with 17 and 21 as rotating generators so related to 15 that the current flow in 15 may be controlled by varying the magnetomotive force in 21, but obviously any electrically equivalent voltage producing means consisting of one or more pieces of apparatus may be used in place of 17 and 21 provided the value of the current flow in 15 may be controlled by varying the magnetomotive forces in these voltage producing means. It should therefore be clear that if 15 is to be supplied with direct current at all times it is possible to replace 31 with any electrically equivalent voltage producing means delivering direct current and having in series with 15 a winding equivalent to winding 32 and by employing winding 24 the current flow in 15 can be adjusted and the adjusted value will be automatically maintained irrespective of changes in the resistance of 15. If winding 24 is not used the current flow in 15 can be adjusted but its value will vary somewhat from the adjusted value with changes in the resistance of 15. It follows that my invention is applicable to any electrical circuit connected to voltage producing means which is capable of controlling the value of the current flow in the circuit by varying the magnetomotive force in the voltage producing means and any additional voltage producing means that is the electrical equivalent of the transformer 31 may be used for varying the magnetomotive force.

Figure 2:
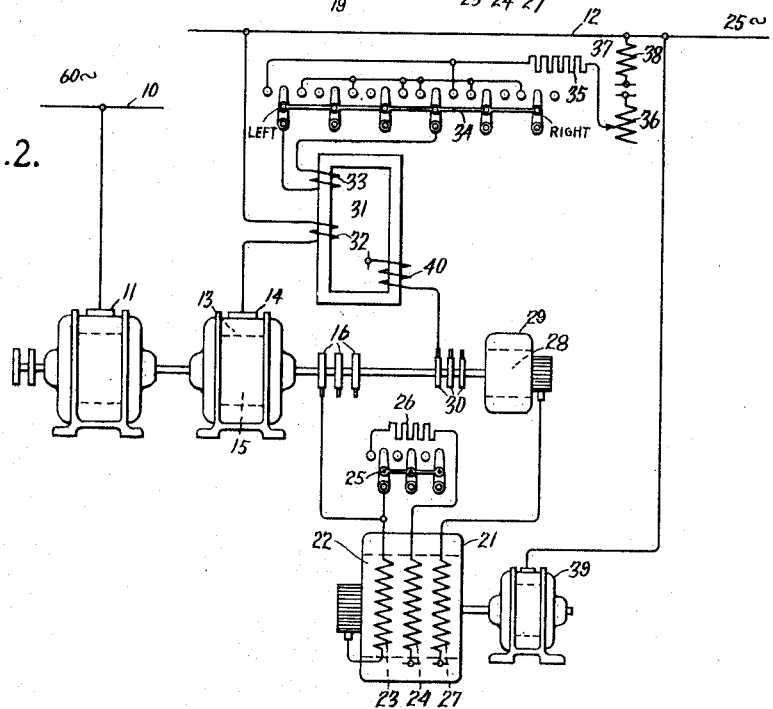
Fig. 2 is similar to Fig. 1 except that in Fig. 2 the exciter and regulating machine are combined into one machine which controls the current flowing in the wound secondary.

In Fig. 2, similar parts to those in Fig. 1 are represented by the same numbers. In Fig. 2 I have eliminated the machine 17 shown in Fig. 1 by connecting the armature winding 22 in series with the compensating winding 23 directly to the collector rings 16 of the wound secondary 15 and therefore in Fig. 2 the machine 21 acts as the regulating machine and controls the current flowing in the secondary winding 15. It is obvious that the operation of the regulating set shown in Fig. 2 will be similar to that described in connection with Fig. 1.

Figure 3:
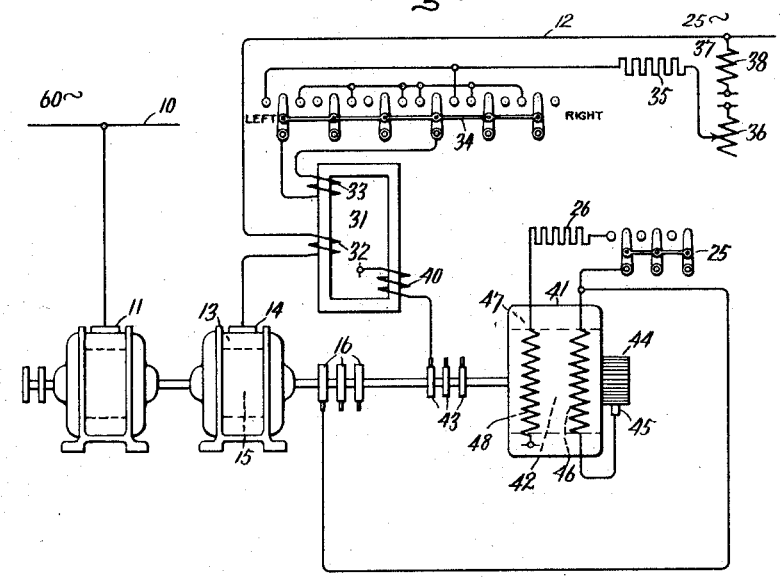
Fig. 3 is similar to Fig. 1 except that in Fig. 3 all three machines are combined into one machine which controls the current flowing in the wound secondary.

In Fig. 3, similar parts to those in Fig. 1 are represented by the same numbers. In Fig. 3 I have shown a machine represented by 41 that performs the combined functions of the machines 17, 21 and 29 in Fig. 1. The machine 41 has a rotatable member 42 carrying a rotatable exciting winding connected to the collector rings 43 which are connected to the transformer secondary winding 40. The rotating member 42 also has a commutated winding connected to the commutator 44 which is connected to the collector rings 16 through the brushes 45 and the compensating winding 46 placed on the stationary member 47 which also has the stationary exciting winding 48 energized by the commutated winding through the stabilizing resistance 26 and the switch 25 when the latter is closed.

The rotatable member 42 is direct connected to 14 so as to rotate at the same speed as 14 and they both have the same number of poles. The connections from 40 to the collector rings 43 are such that the rotating exciting winding of 41 will have a mechanical rotation that is opposite in direction to that of the rotating exciting flux produced in the rotating exciting winding by the current from 40. The rotating exciting flux therefore rotates at slip frequency relative to the stationary member 47 and the currents delivered by the commutator 44 to the secondary 15 and the stationary exciting winding 48 will be of slip frequency. The machine 41 therefore acts as a frequency changer and a regulating machine without the use of any exciter. The machine 41 therefore alone controls the current flowing in the secondary winding 15.

From the explanation given in connection with Fig. 1, it can be seen that in Fig. 3 the rotatable exciting winding connected to collector rings 43 and the stationary exciting winding 48 perform the functions of the windings 27 and 24 respectively in Fig. 1. The operation of the regulating set shown in Fig. 3 will therefore be similar to that described in Fig. 1 and hence the operation need not be described. The regulating machine 41 can be made of practically standard physical size since the corrective current supplied by 40 is very small and the rotatable exciting winding can be made small. The transformer 31 is small since it only supplies a small corrective current. My invention therefore makes possible a regulating set having a very high sensitivity and consisting of a nearly standard regulating machine and a comparatively small transformer, whereas the regulating set described in the patent application referred to needs at least two commutator machines of comparatively large physical size and therefore my regulating set will be considerably cheaper to build.

I have described my invention in connection with certain types of voltage producing means to control the energy flow between two alternating current sources connected to each other through a frequency converter set. It should be obvious that the voltage producing means and the use of the invention as described are for the purpose of explaining the principles of my invention and I therefore wish it understood that all modifications within the true spirt and scope of my invention are intended to be included within the scope of the appended claims.

What I claim as new and desire to secure by Letters Patent of the United States, is:

1. In combination, a source of alternating current, a rotating generator provided with an exciting winding, an electrical circuit in which flows a current whose value can be controlled by varying the excitation of said exciting winding, and means for energizing said exciting winding so as to obtain a desired value of current flow in said circuit, the said means comprising a transformer having two primary windings and a secondary winding, connecting means for energizing one of the primary windings with alternating current from the said source, means for energizing the other primary winding with an alternating current which is substantially directly proportional to the current flowing in said circuit, the two primary windings being arranged to produce opposing magnetomotive forces in said transformer, and connecting means for energizing said exciting winding from the transformer secondary winding.

2. In combination, a source of alternating current, a rotating generator provided with an exciting winding, an electrical circuit in which flows a current whose value can be controlled by varying the excitation of said generator, and means for exciting said generator so as to automatically maintain a substantially constant and direct ratio between the current flowing in said circuit and an independent regulating current, the said means comprising a transformer having two primary windings and a secondary winding, connecting means for energizing one of the primary windings with the said independent regulating current from said source, means for energizing the other primary winding with a current which is substantially directly proportional to the current flowing in said circuit, the two primary windings being arranged to produce opposing magnetomotive forces in said transformer, connecting means for energizing said exciting winding from the transformer secondary winding, thereby producing a magnetic flux in said generator when said opposing magnetomotive forces have unequal values, and means for producing in said generator an additional magnetic flux whose magnitude is substantially directly proportional to the voltage of said generator.

3. In combination, a source of alternating current, a rotating generator provided with two exciting windings, an electrical circuit in which flows a current whose value can be controlled by varying the excitation of said exciting windings, and means for energizing said exciting windings so as to automatically maintain a substantially constant and direct ratio between the current flowing in said circuit and an independent regulating current, the said means comprising a transformer having two primary windings and a secondary winding, connecting means for energizing one of the primary windings with the said independent regulating current from said source, means for energizing the other primary winding with a current which is substantially directly proportional to the current flowing in said circuit, the two primary windings being arranged to produce opposing magnetomotive forces in said transformer, connecting means for energizing one of the exciting windings from the transformer secondary winding, thereby producing a magnetic flux in said generator when said opposing magnetomotive forces have unequal values, and connecting means for energizing the other exciting winding with a current which is substantially directly proportional to the voltage of said generator.

4. In combination with an asynchronous machine acting as one element of a frequency converter set connected between two sources of alternating current, the said asynchronous machine having a primary winding connected to one of said sources and a wound secondary concatenated with a rotating generator provided with an exciting winding, and means for energizing said exciting winding so as to obtain a desired value of energy flow from one of said sources to the other of said sources, the said means comprising an additional rotating generator provided with an exciting winding, connecting means for energizing the first mentioned exciting winding from the additional generator, a transformer having two primary windings and a secondary winding, connecting means for energizing one of the transformer primary windings from the source connected to the primary winding of the asynchronous machine, means for energizing the other transformer primary winding with a current which is substantially directly proportional to the current flowing in the primary winding of the asynchronous machine, the two transformer primary windings being arranged to produce opposing magnetomotive forces in said transformer, and frequency changing means connected between the transformer secondary winding and the exciting winding of the additional generator to energize the last mentioned exciting winding with a current having the frequency of the current in the wound secondary.

5. In combination with an asynchronous machine acting as one element of a frequency converter set connected between two sources of alternating current, the said asynchronous machine having a primary winding connected to one of said sources and a wound secondary concatenated with a rotating generator provided with an exciting winding, and means for energizing said exciting winding so as to automatically maintain a substantially constant and direct ratio between an independent regulating current and the energy flow from one of said sources to the other of said sources irrespective of the variations in frequencies of said sources, the said means comprising an additional rotating generator provided with two exciting windings, connecting means for energizing the first mentioned exciting winding from the additional generator, a transformer having two primary windings and a secondary winding, connecting means for energizing one of the transformer primary windings with the said independent regulating current from the source connected to the primary winding of the asynchronous machine, means for energizing the other transformer primary winding with a current which is substantially directly proportional to the current flowing in the primary winding of the asynchronous machine, the two transformer primary windings being arranged to produce opposing magnetomotive forces in said transformer, frequency changing means connected between the transformer secondary winding and one of the exciting windings of the additional generator to energize the last mentioned exciting winding with a current having the frequency of the current in the wound secondary, and connecting means for energizing the other exciting winding of the additional generator with a current which is substantially directly proportional to the voltage of the additional generator.

6. In combination with an asynchronous machine acting as one element of a frequency converter set connected between two sources of alternating current, the said asynchronous machine having a primary winding connected to one of said sources and a wound secondary concatenated with a rotating generator provided with an exciting winding, and means for energizing said exciting winding so as to obtain a desired value of energy flow from one of said sources to the other of said sources, the said means comprising a transformer having two primary windings and a secondary winding, connecting means for energizing one of the transformer primary windings from the source connected to the primary winding of the asynchronous machine, means for energizing the other transformer primary winding with a current which is substantially directly proportional to the current flowing in the primary winding of the asynchronous machine, the two transformer primary windings being arranged to produce opposing magnetomotive forces in said transformer, and frequency changing means connected between the transformer secondary winding and the exciting winding to energize the latter with a current having the frequency of the current in the wound secondary.

7. In combination with an asynchronous machine acting as one element of a frequency converter set connected between two sources of alternating current, the said asynchronous machine having a primary winding connected to one of said sources and a wound secondary concatenated with a rotating generator provided with two exciting windings, and means for energizing said exciting windings so as to automatically maintain a substantially constant and direct ratio between an independent regulating current and the energy flow from one of said sources to the other of said sources irrespective of the variations in frequencies of said sources, the said means comprising a transformer having two primary windings and a secondary winding, connecting means for energizing one of the transformer primary windings with the said idependent regulating current from the source connected to the primary winding of the asynchronous machine, means for energizing the other transformer primary winding with a current which is substantially directly proportional to the current flowing in the primary winding of the asynchronous machine, the two transformer windings being arranged to produce opposing magnetomotive forces in said transformer, frequency changing means connected between the transformer secondary winding and one of the exciting windings to energize the last mentioned exciting winding with a current having the frequency of the current in the wound secondary, and connecting means for energizing the other exciting winding with a current which is substantially directly proportional to the voltage of the generator.

8. In combination with an asynchronous machine acting as one element of a frequency converter set connected between two sources of alternating current, the said asynchronous machine having a primary winding connected to one of said sources and a wound secondary concatenated with the commutated winding of a frequency changer having a rotatable exciting winding, and means for energizing said exciting winding so as to obtain a desired value of energy flow from one of said sources to the other of said sources, the said means comprising means to rotate said frequency changer at a speed which is directly proportional to the speed of said asynchronous machine, a transformer having two primary windings and a secondary winding, connecting means for energizing one of the transformer primary windings from the source connected to the primary winding of the asynchronous machine, means for energizing the other transformer primary winding with a current which is substantially directly proportional to the current flowing in the primary winding of the asynchronous machine, the two transformer primary windings being arranged to produce opposing magnetomotive forces in said transformer, and connecting means between the transformer secondary winding and the rotatable exciting winding.

9. In combination with an asynchronous machine acting as one element of a frequency converter set connected between two sources of alternating current, the said asynchronous machine having a primary winding connected to one of said sources and a wound secondary concatenated with the commutated winding of a frequency changer having a rotatable exciting winding and a stationary exciting winding, and means for energizing said exciting windings so as to automatically maintain a substantially constant and direct ratio between an independent regulating current and the energy flow from one of said sources to the other of said sources irrespective of the variations in frequencies of said sources, the said means comprising means to rotate said frequency changer at a speed which is directly proportional to the speed of said asynchronous machine, a transformer having two primary windings and a secondary winding, connecting means for energizing one of the transformer primary windings with the said independent regulating current from the source connected to the primary winding of the asynchronous machine, means for energizing the other transformer primary winding with a current which is substantially directly proportional to the current flowing in the primary winding of the asynchronous machine, the two transformer primary windings being arranged to produce opposing magnetomotive forces in said transformer, connecting means between the transformer secondary winding and the rotatable exciting winding, and connecting means to energize the stationary exciting winding with a current which is substantially directly proportional to the voltage of said commutated winding.

10. In combination, a source of alternating current, a dynamo electric machine provided with an exciting winding, an asynchronous machine having a primary winding electrically connected to said source and a wound secondary in which flows a current whose value can be controlled by varying the excitation of said exciting winding, and means for energizing said exciting winding so as to obtain a desired value of current flow in said primary winding, the said means comprising a transformer having two primary windings and a secondary winding, connecting means for energizing one of the transformer primary windings from said source, means for energizing the other of the transformer primary windings with a current which is substantially directly proportional to the current flowing in the primary winding of said asynchronous machine, the two transformer primary windings being arranged to produce opposing magnetomotive forces in said transformer, and frequency changing means connected between said transformer secondary winding and said exciting winding for energizing the latter with a current having the frequency of the current flowing in the wound secondary of said asynchronous machine.

11. In combination, a source of alternating current, a dynamo electric machine provided with two exciting windings, an asynchronous machine having a primary winding electrically connected to said source and a wound secondary in which flows a current whose value can be controlled by varying the excitation of said exciting windings, and means for energizing said exciting windings so as to automatically maintain a substantially constant and direct ratio between the current flowing in said primary winding and an independent regulating current, the said means comprising a transformer having two primary windings and a secondary winding, connecting means for energizing one of the transformer primary windings with the said independent regulating current from said source, means for energizing the other of the transformer primary windings with a current which is substantially directly proportional to the current flowing in the primary winding of said asynchronous machine, the two transformer primary windings being arranged to produce opposing magnetomotive forces in said transformer, frequency changing means connected between said transformer secondary winding and one of said exciting windings for energizing the latter with a current having the frequency of the current in the wound secondary of said asynchronous machine, and connecting means for energizing the other exciting winding with a current which is substantially directly proportional to the voltage of said dynamo electric machine.

12. In combination, a source of alternating current, a dynamo electric machine provided with an exciting winding, an electrical circuit in which flows a current whose value can be controlled by varying the excitation of said exciting winding, and means for energizing said exciting winding so as to obtain a desired value of current flow in said circuit, the said means comprising transformer means provided with primary and secondary windings, connecting means for energizing one of the primary windings with an adjustable alternating current from said source and for energizing another of the primary windings with an alternating current whose value is substantially directly proportional to the value of the current flowing in said circuit, the windings of said transformer means being arranged to deliver a secondary current whose value is substantially directly proportional to the vector difference between its primary currents, and connecting means for energizing said exciting winding with a current whose value is substantially directly proportional to the value of said secondary current.

13. In combination, a source of alternating current, a dynamo electric machine provided with two exciting windings, an electrical circuit in which flows a current whose value can be controlled by varying the excitation of said exciting windings, and means for energizing said exciting windings so as to automatically maintain a substantially constant and direct ratio between the current flowing in said circuit and an independent regulating current, the said means comprising transformer means provided with primary and secondary windings, connecting means for energizing one of the primary windings with said regulating current from said source and for energizing another of the primary windings with a current whose value is substantially directly proportional to the value of the current flowing in said circuit, the windings of said transformer means being arranged to deliver a secondary current whose value is substantially directly proportional to the vector difference between its primary currents, connecting means for energizing one of said exciting windings with a current whose value is substantially directly proportional to the value of said secondary current, and connecting means for energizing the other of said exciting windings with a current whose value is substantially directly proportional to the voltage of said dynamo electric machine.

In witness whereof, I have hereunto set my hand this 27th day of August, 1930.

JOHN I. HULL.

CERTIFICATE OF CORRECTION.

Patent No. 1,865,414.  June 28, 1932.

JOHN I. HULL.

It is hereby certified that error appears in the printed specification of the above numbered patent requiring correction as follows: Page 5, line 43, for "to" first occurrence read 10; page 8, line 75, claim 7, for the misspelled word "idependent" read independent; and that the said Letters Patent should be read with these corrections therein that the same may conform to the record of the case in the Patent Office.

Signed and sealed this 6th day of September, A. D. 1932.

(Seal)

M. J. Moore,
Acting Commissioner of Patents.